(12) United States Patent
Carreras et al.

(10) Patent No.: US 6,332,687 B1
(45) Date of Patent: Dec. 25, 2001

(54) PLUNGER CONTROLLED, NEAR-PARABOLIC OPTICAL MEMBRANE MIRROR

(75) Inventors: Richard A. Carreras; Dan K. Marker, both of Albuquerque; James M. Wilkes, Sandia Park; Dennis Duneman; James R. Rotge, both of Albuquerque, all of NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/704,940

(22) Filed: Nov. 2, 2000

(51) Int. Cl.$^7$ .............................. G02B 5/08; G02B 7/182
(52) U.S. Cl. ......................... 359/846; 359/847; 359/878
(58) Field of Search ...................................... 359/846, 847, 359/848, 849, 868, 869, 871, 877, 878

(56) References Cited

U.S. PATENT DOCUMENTS 5,210,654 * 5/1993 Williams .............................. 359/847

OTHER PUBLICATIONS

J. M. Wilkes, Jenkins, C. H., Marker, D. K., Carreras, R. A., Duneman, D. C., and J. R. Rotge, "Concave membrane mirrors from aspheric to near–parabolic," Proc. of the SPIE, V. 3760, pp. 213–223, Jul. 19–20, 1999.

* cited by examiner

Primary Examiner—Mark A Robinson
(74) Attorney, Agent, or Firm—Kenneth E. Callahan

(57) ABSTRACT

A membrane mirror having an optical quality spherical shape maintained by differential pressure takes a near parabolic shape when a plunger-induced displacement of the central area of the mirror is introduced. The focal length can be adjusted by varying the differential pressure.

2 Claims, 6 Drawing Sheets

1-Parabola
2-Spherical
3-Deterministic

With Plunger
0.1 μm spherical aberration

Without Plunger
-0.8 μm spherical aberration

PLUNGER CONTROLLED, NEAR-PARABOLIC OPTICAL MEMBRANE MIRROR

STATEMENT OF GOVERNMENT INTEREST

The invention described herein may be manufactured and used by or for the Government for governmental purposes without the payment of any royalty hereon.

BACKGROUND OF THE INVENTION

1. Field of the Invention

The invention is in the field of large membrane mirrors, and in particular relates to a method for obtaining optical quality parabolic mirror shapes.

2. Description of the Prior Art

Various focusing mirror systems fabricated from a reflective metallized membrane are known in the prior art. Commonly, a differential pressure is established between an enclosed area behind the reflective surface and the ambient pressure to control the contour of the flexible reflective surface. The curvature is controlled by various means, such as: an electropneumatic control system (U.S. Pat. No. 4,179,193); an actuator pushing or pulling on a rear membrane surface (U.S. Pat. No. 5,016,998); a double membrane with a partial vacuum between with a complex edge tensioning system to vary the curvature (U.S. Pat. Nos. 5,680,262 and 5,552,006); and a curvature determined by uniform differential pressure applied to a membrane with a non-uniform radial distribution of thickness or a uniform membrane loaded with a non-uniform differential pressure obtained by localized electrostatic or magnetic pressure (U.S. Pat. No. 4,046,462).

Most of the aforementioned inventions are designed for solar energy concentrators. The curvatures obtained do not approach the optical quality required of an astronomical telescope. Optical quality telescopes used with real time monochromatic holography, for example, should have surfaces that deviate no more than 40 lines per mm of localized tilt and 200 waves of a low spatial frequency aberration for any given mirror figure. This situation should produce a near (1.6X) diffraction limited image. Very large optical apertures, particularly for space-based systems, could benefit from lightweight, optical quality membrane mirrors. Potential applications include astronomy, imaging and surveillance, and laser beam projection.

A method for obtaining optical quality spherical membrane shapes is discussed in U.S. Pat. No. 6,113,242 by the present inventors. This patent is hereby incorporated by reference.

SUMMARY OF THE INVENTION

The present invention produces an optical quality membrane mirror of parabolic shape that can be configured as the primary aperture of an optical telescope. The invention is an improvement on the basic optical quality membrane mirror design described in U.S. Pat. No. 6,113,242. The present invention uses a plunger to impart stress at the center of the membrane mirror to force the non-central membrane material to take on the surface shape of a parabola.

BRIEF DESCRIPTION OF THE DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DESCRIPTION OF THE PREFERRED EMBODIMENT

Figure 1:
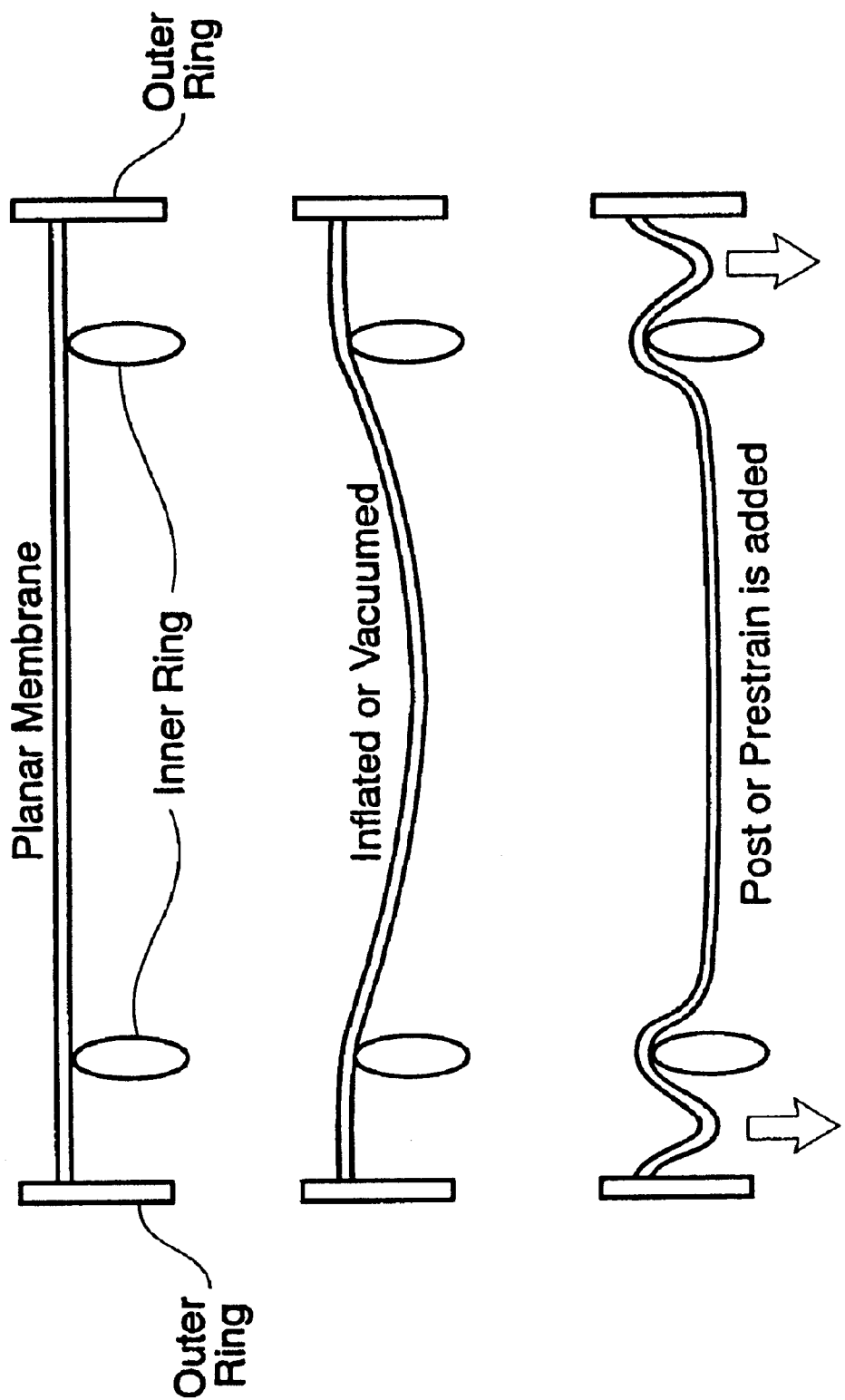
FIG. 1 is a cross-sectional view of the thin-film membrane mirror showing the inner and outer rings under various strain conditions (prior art).

The present invention produces an optical quality membrane mirror of parabolic shape that could be configured as the primary aperture of an optical telescope. The invention is an improvement on the basic optical quality membrane mirror design described in U.S. Pat. No. 6,113,242, a mirror comprised of a flat, reflective membrane material stretched over an outer ring to first form a flat mirror. This flat, stretched, membrane was than either evacuated or positive pressure was applied to deform the flat membrane mirror into a doubly curved surface to be used as a primary aperture of a large telescope. The '242 design produced an optical quality spherically shaped mirror. Many telescope designs, however, are optimized for a primary aperture to be parabolic and not spherical. The present invention uses a plunger to impart stress at the center of this membrane to thereby force the membrane material to take on the surface shape of a parabola.

A doubly curved surface was used to produce a membrane mirror having the optical quality curvature characteristics of the '242 patent. The film was mounted on an optically flat circular ring and stretched over a smaller optically flat circular ring as shown in the cross-sectional diagram of FIG. 1. Pressure or vacuum was separately applied to both the inner ring and the outer annulus to produce the optical quality (spherical) curvature in the inner ring. In the atmosphere, pulling a partial vacuum on the underside of the membrane mirror creates a pressure differential. In space, a pressure chamber that is bounded by the mirrored surface and a clear polyimide sheet creates the curvature of the optic. The combination of these two sheets is referred to as the lenticular.

The reflective membranes or films may vary in thickness from 20 to 200 microns. In the preferred embodiment, an aluminum coated 125-micron thick homogeneous, planar, isotropic polyimide membrane with an inner ring aperture of 28-cm was used. An optical quality 4.47-meter concave radius of curvature figure was obtained for the 28-cm aperture. Measurement of the membrane's curvature was done with a Shack-Hartmann wavefront sensor using a 66X88-lenslet array with the focal length of each lenslet at 2 millimeters. The angular range of each lenslet is approximately ±17 milliradians.

To minimize the influence of the boundary conditions, care was exercised in the manufacturing of the inner and outer rings and in the membrane mounting process. The outer ring, where the film is initially mounted and the inner ring where the boundary of the doubly curved surface is initiated were both optically polished planar to less than 150 nanometers. The outer ring defines the outer boundary of the membrane and if the edge is not well defined an aberrated optical surface will result. The degradation in mirror quality is proportional to the magnitude of the boundary deviation. A large deviation at the boundary of the mirror will transmit undesirable figure error into the clear aperture of the membrane.

The volume between the inner ring and the outer ring forms an outer annulus. The inner ring has a doubly curved, optically polished top surface so that the membrane can slide across it with near zero friction while maintaining a seal between the inner ring and the outer annulus even when the membrane has a concave curvature in both regions.

Incremental stress is defined as membrane stress caused by other than the evacuation stress of the inner ring, e.g., the initial clamping of the membrane to the outer ring, out of plane translation of the outer ring with respect to the inner ring, or evacuation of the outer annulus. Incremental stress, for example, can be uniformly applied to the membrane by varying the differential pressure in the outer annulus, a pressure that in general is different than that in the inner ring volume.

The outer ring should be coplanar with the inner ring, otherwise a non-symmetric stress state will be created. The last significant boundary condition involves the material that slides across the inner ring during a change of curvature, as shown in FIG. 1, which varies the amount of incremental strain in the material. This incremental strain has a remarkable effect on the optical figure. The hardware arrangement enables one to optically modify the surface figure by varying the amount of incremental strain.

The strain state of the membrane determines the surface figure. The stress and strain states resulting from forces added during evacuation are highly nonlinear. (Stress $\sigma$ is the force tending to produce deformation in the membrane measured in force/unit area. Strain $\epsilon$ is the deformation resulting from a stress measured by the ratio of the change to the total value of the dimension in which the change occurred. In the two-dimensional membrane case, a 2% strain would be an increase of 2% in the surface area of the membrane caused by an imposed stress.)

Figure 2:
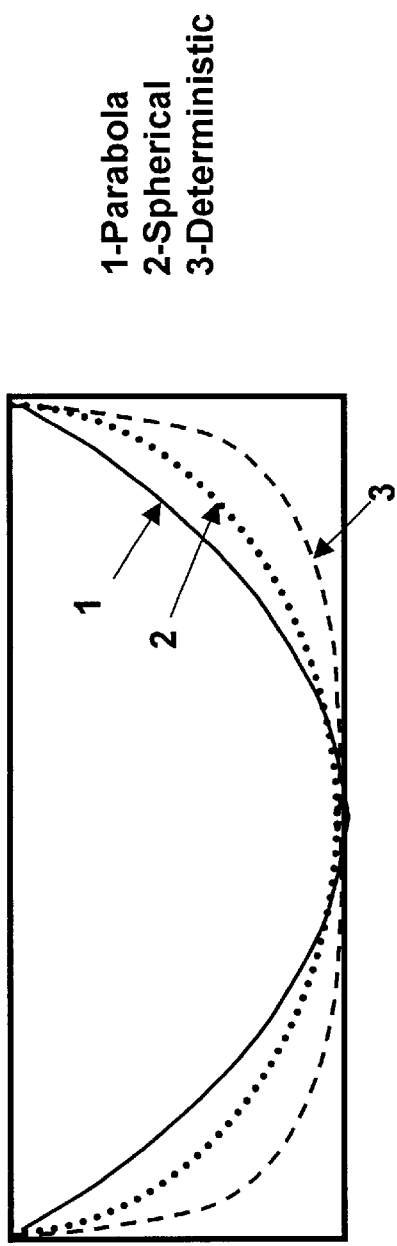
FIG. 2 is a cross-sectional view through the center of a deformed membrane mirror.

FIG. 2 shows a slice through the center of a deformed membrane mirror having a parabolic 1, spherical 2 and deterministic 3 shape. All three curves meet at the edges and at the center because the center deflection is made the reference point for all three curves and the membrane is attached and clamped at the edges. When the stretched, planar membrane is deformed (via, evacuation or other methods) the deterministic position is achieved. This deterministic position is not useful for any optical designs. A spherical shape can be achieved from the deterministic shape through the application of strain along the rim.

Figure 3:
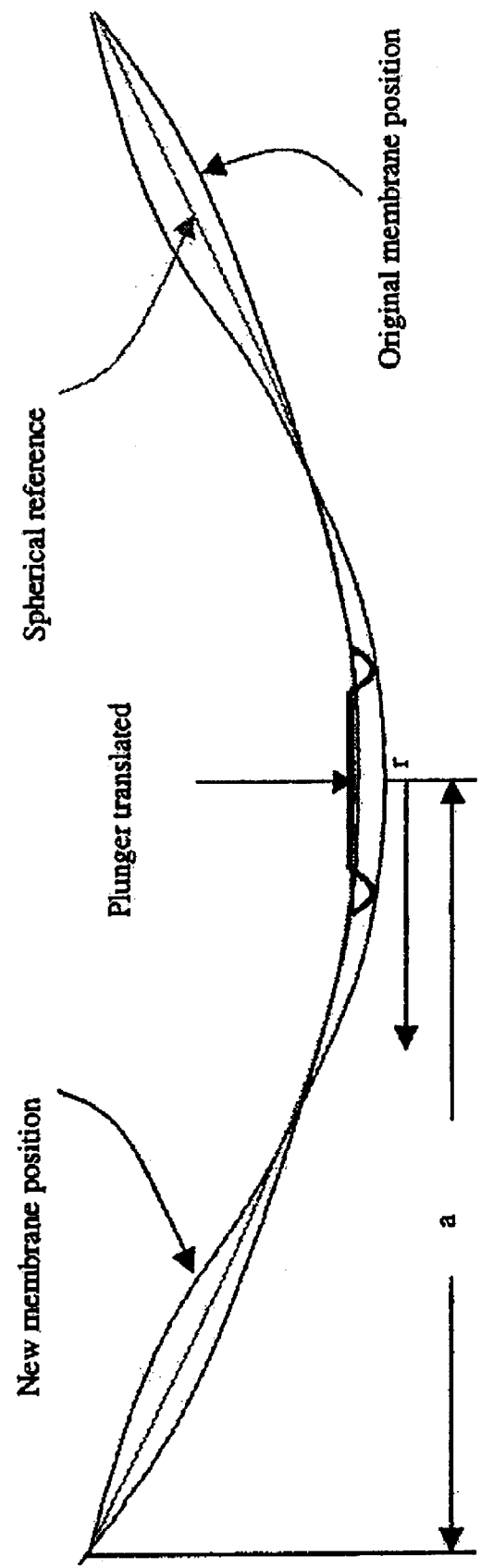
FIG. 3 is a cross-sectional view of the thin-film membrane mirror with stress imparted by a central plunger.

In the present invention a plunger (FIG. 3) with varying footprint was used to impart a force on the center of the spherical mirror surface of the above described membrane mirror to thereby impart a parabolic shape to the mirror. A portion of the membrane is thus translated along the optical axis a controllable distance. As the plunger is pressed against the membrane, the interior pressure difference must be reduced a small amount since increased plunger action will tend to reduce the focal length. This technique reduces the usable optical surface somewhat due to the plunger's strong influence near the plunger-membrane contact. For a circular plunger disk of less than half the diameter of the mirror, the useful optical collecting area would be restricted to roughly the outer half of the membrane aperture, but still representing approximately 75% of the total collecting area.

The plunger disk has its symmetry axis oriented parallel to the optical axis of the membrane mirror with one face pressed against the center of the membrane. The portion of the plunger in contact with the mirror surface can be a flat disk with a circular deflection collar about its circumference. The deflection collar is used to distribute the plunger force into the membrane equally along the footprint edge.

The footprint of the plunger, i.e., the portion of the plunger in contact with the mirror membrane, was varied in size. Generally, the larger plunger footprint produced a more perfect parabolic shape to the remaining mirror (the mirror area remaining outside the plunger footprint). However, there is a tradeoff between having a better parabolic shape and the amount of usable mirror area needed for the optics—between an ideal focus and the mirror's light-gathering capacity. A circular footprint was found to work best.

Figure 4:
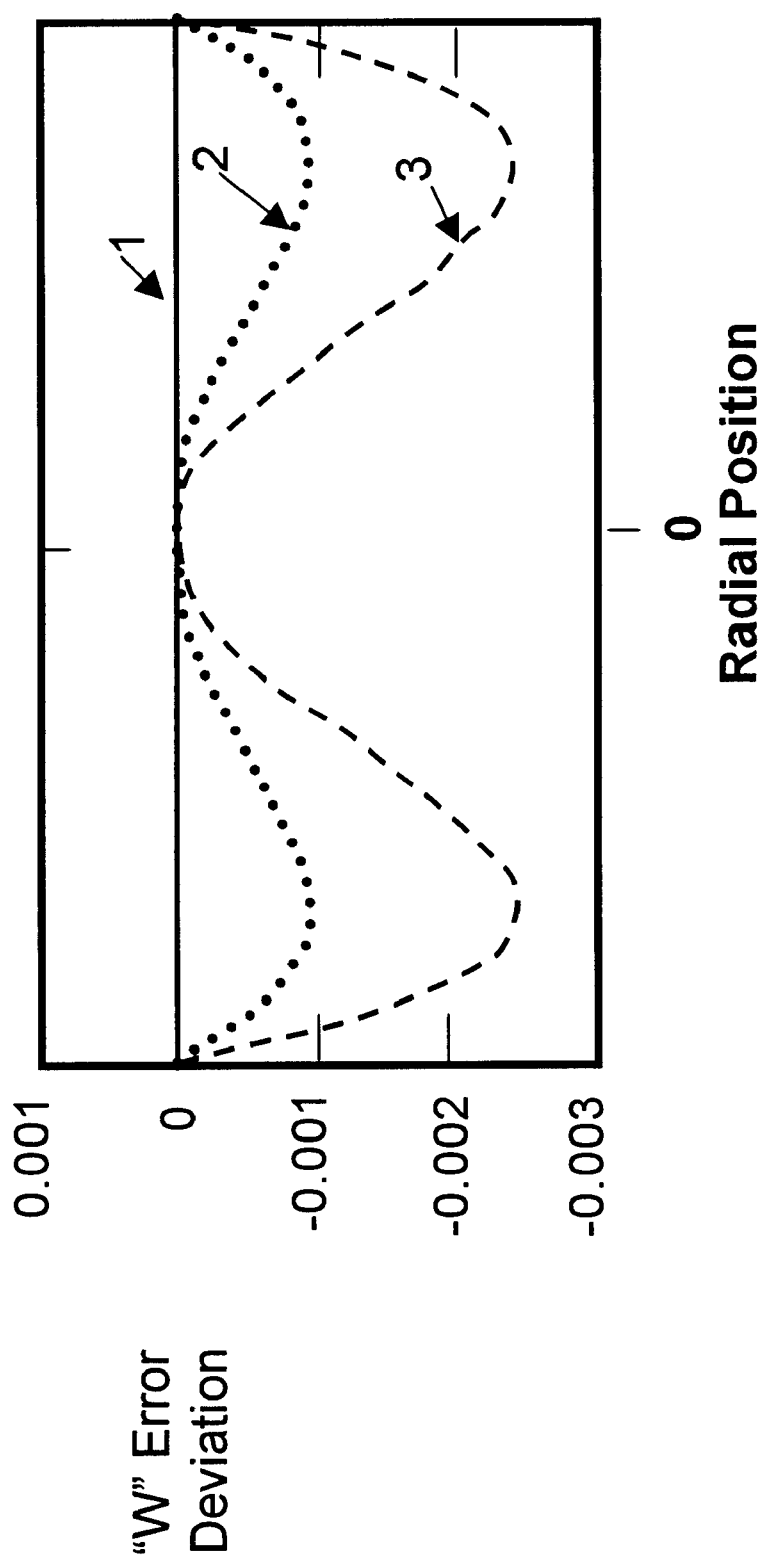
FIG. 4 is cross-sectional view that shows the "W" error with respect to a parabola.
Figure 5:
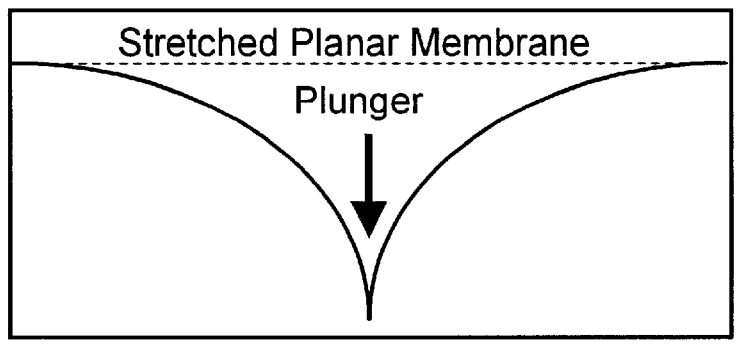
FIG. 5 shows the effect of the plunger on the stretched planar membrane.
Figure 6:
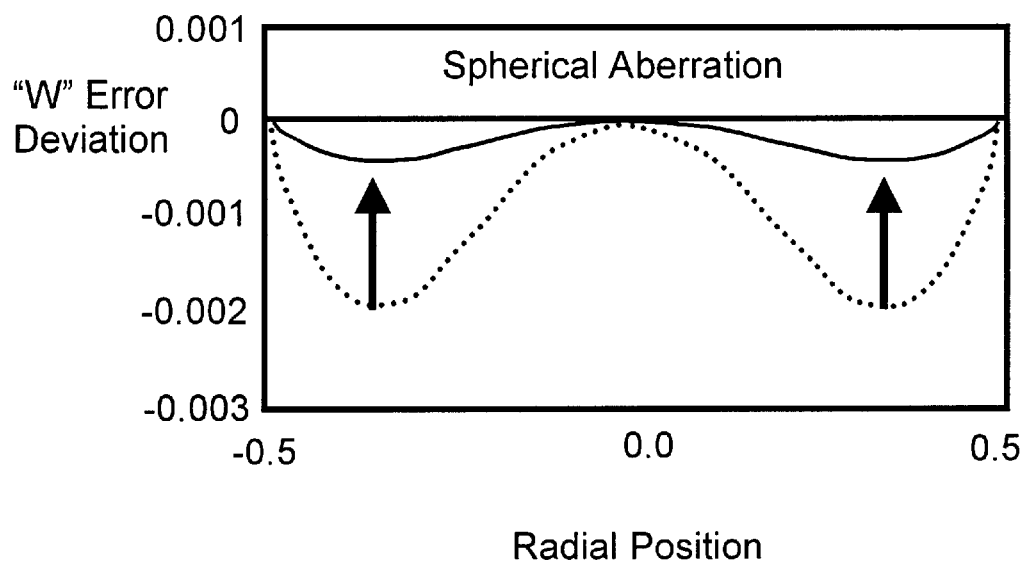
FIG. 6 shows the reduction in spherical aberration (from the ideal parabolic curve) with the application of a plunger.

The deviation from the preferred parabolic position is characterized as an error. This type of deviation is referred to as the "W" error. FIG. 4 shows the "W" error with respect to a parabola 1 of the spherical 2 and deterministic 3 shapes. This is nothing more that the difference between the parabolic line and the other two lines in FIG. 2. It is easy to see from the shape of the deviations where the term "W" error came from. The plunger deforms the membrane in the direction that tends to cancel the "W" error. FIG. 5 shows the effect of the plunger on the stretched planar membrane. FIG. 6 shows the reduction in spherical aberration (from the ideal parabolic curve) with the application of a plunger.

Figure 7:
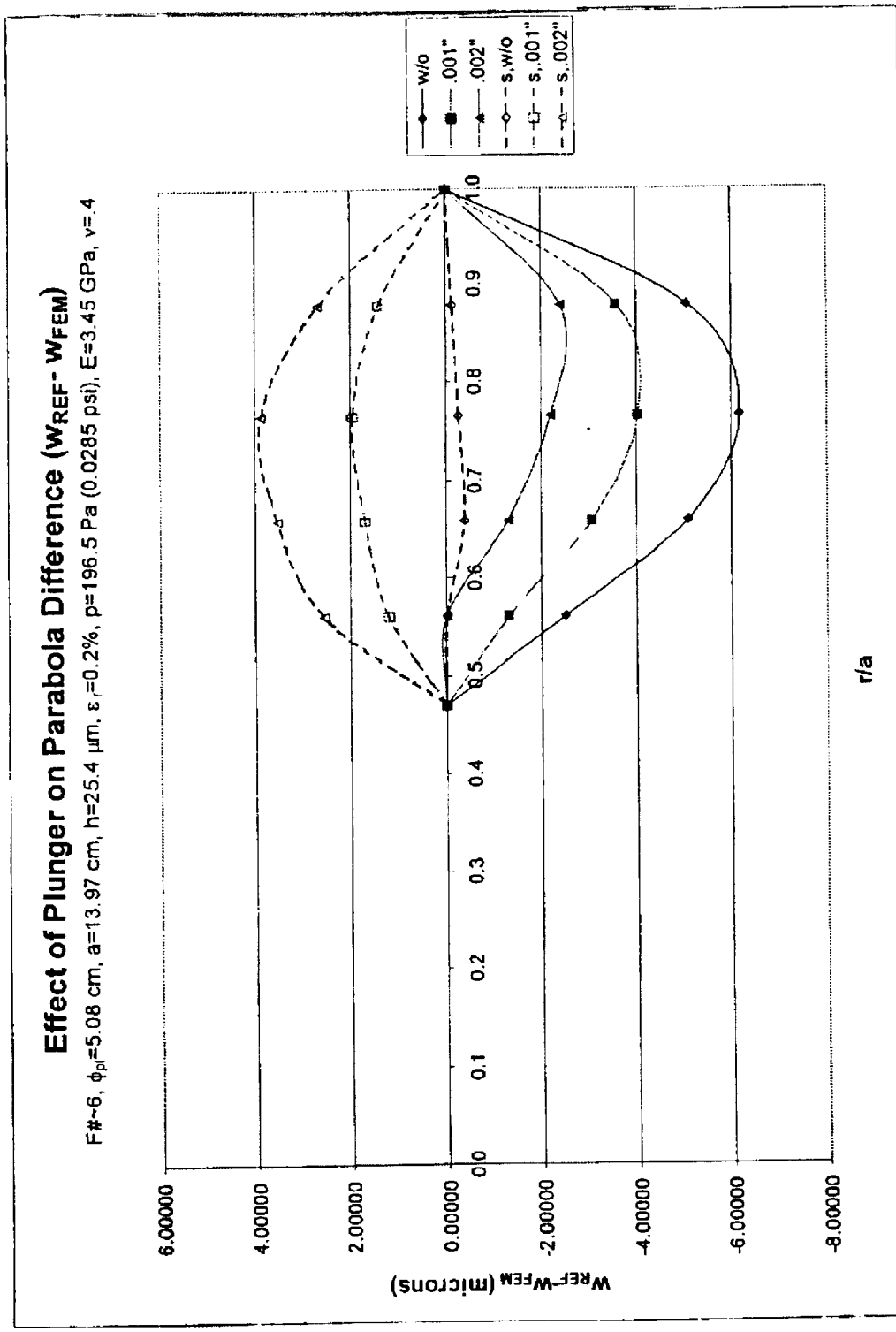
FIG. 7 is a plot calculated along the cross-section radius of the membrane mirror for various plunger displacements.

The Finite Element Method (FEM) software ABAQUS was used to model the effect of the plunger. The modeling results are shown in FIG. 7 plot. The plot was created using a radius of 5.5 inches, a membrane thickness of 25.4 $\mu$m, a plunger diameter of 2 inches, a f/6, a Poisson's Ratio of 0.4, and a Modulus of Elasticity of 500,000 psi.

The plot in FIG. 7 is a cross-section radius of the membrane mirror. As can be seen in this plot, there is no data on the left side of the figure because the plunger is obscuring the center part of the aperture. This graph shows the results as the plunger is applied to the membrane mirror (i.e., from no plunger contact on the membrane, to 0.001-inch displacement, to 0.002-inch displacement). The horizontal, 0.0 line is the reference line for both a parabola and the sphere.

The results of the lower three curves in the plot are with respect to a parabola reference. Thus, as the plunger is applied, the parabolic error gets less and less as anticipated. The upper three curves in the plot show the error with respect to a spherical reference. As the plunger is applied to the membrane mirror (i.e. from no plunger contact on the membrane, to 0.001-inch, to 0.002-inches) the error is increased. The application of the plunger increases the spherical error, and the surface of the membrane mirror starts to look less spherical and more parabolic.

The first curve the spherical error curves (top 3) has the least spherical error and is below the reference line. It is the no plunger case and has the least spherical error because pre-stain was applied to the membrane material in order to get it as close to spherical as possible. This is the starting point; thereafter the two plunger displacements were made and the deviation measured. A sign reversal of the spherical error occurs when the plunger is applied.

Figure 8A:
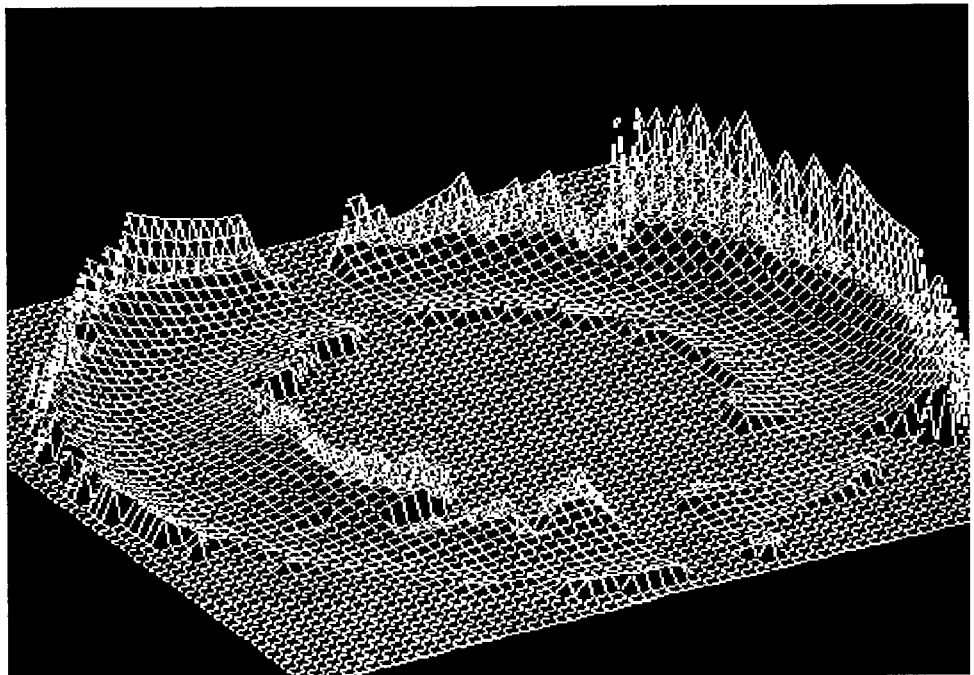
FIG. 8a and FIG. 8b shows the wavefront error with respect to a spherical curvature with and without a plunger measured by a Shack-Hartmann wavefront sensor.
Figure 8B:
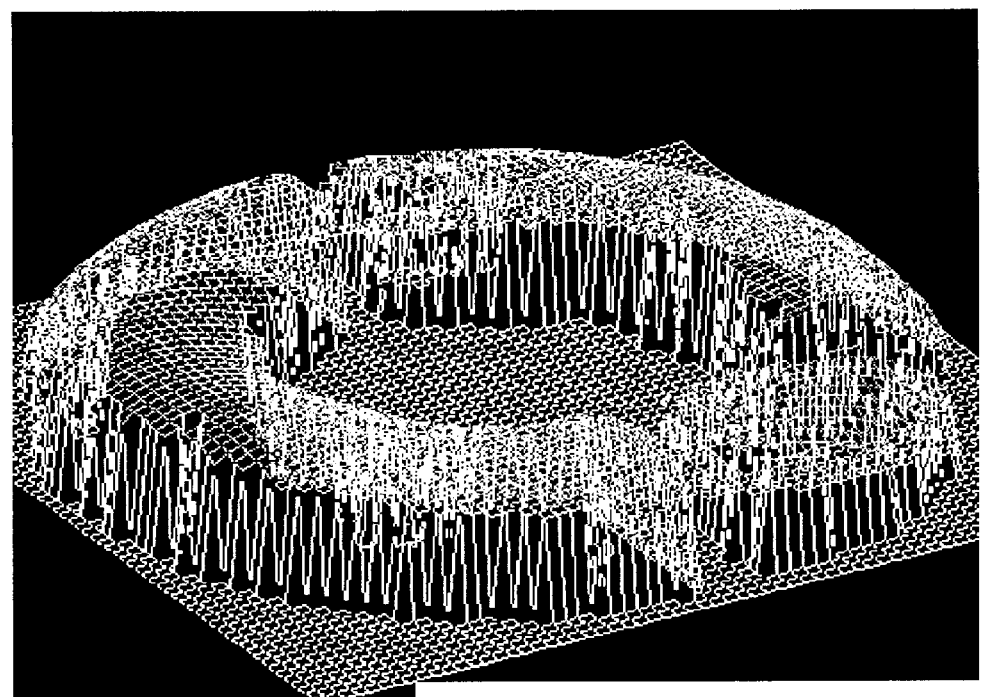

This FEM analysis was verified in the laboratory. FIG. 8 shows some preliminary data taken using a Shack-Hartmann wavefront sensor. FIG. 8a shows the wavefront error with respect to a spherical curvature without a plunger applied. FIG. 8b shows the wavefront error with the plunger applied. This data shows that the spherical error goes from negative to positive as the plunger is applied, verifying the analytical modeling. The wavefront sensor only detects the spherical error; thus, as the wavefront sensor has a change of sign in a spherical error, one can assume that the membrane mirror is becoming more parabolic.

We claim:

1. For an active edge-controlled optical quality membrane mirror with a spherical mirror shape produced by differential pressure, a method for producing a parabolic mirror shape comprised of displacing the central portion of said spherical membrane mirror along its optical axis with a plunger having a flat circular disk of diameter less than half the spherical mirror diameter in contact with said membrane.

2. The parabolic membrane mirror of claim 1, whereby the differential pressure on said membrane mirror surface is correspondingly altered relative to said plunger displacement to vary the focal length.

* * * * *